(12) United States Patent
Guo et al.

(10) Patent No.: US 11,210,330 B2
(45) Date of Patent: Dec. 28, 2021

(54) METHOD AND APPARATUS FOR STORING, READING, AND DISPLAYING PLURALITY OF MULTIMEDIA FILES

(71) Applicant: HANGZHOU HIKVISION DIGITAL TECHNOLOGY CO., LTD., Zhejiang (CN)

(72) Inventors: Bin Guo, Zhejiang (CN); Long Zhang, Zhejiang (CN); Anmin Xin, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 270 days.

(21) Appl. No.: 16/317,059

(22) PCT Filed: Jun. 21, 2017

(86) PCT No.: PCT/CN2017/089400
§ 371 (c)(1),
(2) Date: Jan. 11, 2019

(87) PCT Pub. No.: WO2018/010530
PCT Pub. Date: Jan. 18, 2018

(65) Prior Publication Data
US 2019/0228028 A1 Jul. 25, 2019

(30) Foreign Application Priority Data
Jul. 13, 2016 (CN) .......................... 201610556249.X

(51) Int. Cl.
*G06F 16/00* (2019.01)
*G06F 16/41* (2019.01)
*G06F 16/13* (2019.01)

(52) U.S. Cl.
CPC .............. *G06F 16/41* (2019.01); *G06F 16/13* (2019.01)

(58) Field of Classification Search
CPC ........... G06F 16/41; G06F 16/13; G06F 16/45
See application file for complete search history.

(56) References Cited

U.S. PATENT DOCUMENTS 9,158,472 B2 * 10/2015 Kesselman ........... G06F 3/0614
9,633,015 B2 * 4/2017 Arngren .................. G06F 16/41
(Continued)

FOREIGN PATENT DOCUMENTS

| CN | 102082768 | 6/2011 |
| CN | 104035993 | 9/2014 |

(Continued)

OTHER PUBLICATIONS

International Search Report (English) and Written Opinion dated Sep. 22, 2017, from International Application No. PCT/CN2017/089400, 9 pages.

(Continued)

*Primary Examiner* — Leslie Wong
(74) *Attorney, Agent, or Firm* — Meunier Carlin & Curfman LLC

(57) ABSTRACT

A method and an apparatus for storing, reading, and displaying a plurality of multimedia files are disclosed. The method for storing a plurality of multimedia files includes: obtaining file description information of each of the plurality of multimedia files to be stored, determining a file identifier according to the file description information of each multimedia file to be stored, and storing the file identifier to the file identifier data block (S101); obtaining a file type and path information of each multimedia file to be stored, and storing the path information of each multimedia file to a file information data block corresponding to the file type, and (Continued)

sequentially storing, according to the storage order of respective file information data blocks, a file type corresponding to each file information data block to the overall information data block (S102); determining storage location information of each file information data block, and storing the storage location information to an index information data block (S103); and combining the file identifier data block, the overall information data block, the at least one file information data block, and the index information data block into an integrated file (S104). The method stores a plurality of various multimedia files as an integrated file, which makes it convenient for a user to view the files.

8 Claims, 9 Drawing Sheets

(56) References Cited

U.S. PATENT DOCUMENTS

| | | | | |
|---|---|---|---|---|
| 2002/0083433 | A1* | 6/2002 | Yamanaka | G11B 27/105 725/1 |
| 2004/0177319 | A1* | 9/2004 | Horn | G06F 16/26 715/205 |
| 2004/0220926 | A1* | 11/2004 | Lamkin | G06F 21/10 |
| 2005/0038826 | A1* | 2/2005 | Bae | G06F 16/41 |
| 2007/0038687 | A1* | 2/2007 | Carroll | G06F 16/113 |
| 2007/0079240 | A1 | 4/2007 | Zhang | |
| 2007/0192446 | A1* | 8/2007 | Ivory | G06F 16/41 709/220 |
| 2008/0195664 | A1* | 8/2008 | Maharajh | H04L 67/306 |
| 2008/0228825 | A1* | 9/2008 | Basso | G11B 27/3027 |
| 2009/0254843 | A1* | 10/2009 | Van Wie | G06F 3/04815 715/757 |
| 2010/0306283 | A1* | 12/2010 | Johnson | G06F 16/125 707/803 |
| 2010/0332479 | A1* | 12/2010 | Prahlad | G06F 16/1748 707/741 |
| 2011/0282896 | A1* | 11/2011 | Kaila | G06F 16/48 707/769 |
| 2013/0318042 | A1* | 11/2013 | Rajabi | G06F 16/13 707/624 |
| 2013/0325859 | A1* | 12/2013 | Porter | G06Q 10/109 707/736 |
| 2016/0062992 | A1* | 3/2016 | Chen | H04L 9/3231 707/736 |

FOREIGN PATENT DOCUMENTS

| | | |
|---|---|---|
| CN | 104199899 | 12/2014 |
| CN | 104933062 | 9/2015 |
| EP | 1583005 A2 | 10/2005 |
| EP | 1667037 A1 | 6/2006 |

OTHER PUBLICATIONS

Wikipedia, Indexed File; Peter Flask. Nov. 26, 2015.
17826868.6, PCT/CN2017/089400; Extended European Search Report; dated Apr. 4, 2019.

* cited by examiner

| | |
|---|---|
| XX publicity material (file identifier data block) | |
| File type 1<br>File type 2<br>File type 3<br>(overall information data block) | |
| Storage location information 1<br>Storage location information 2<br>Storage location information 3<br>(index information data block) | |
| Video file path information<br>(file information data block 1) | |
| Audio file path information<br>(file information data block 2) | |
| Text file path information<br>(file information data block 3) | |

FIG. 1c

| | |
|---|---|
| IFMF | file identifier data block |
| IFOD | overall information data block |
| IFID | index information data block |
| IFFD | file information data block 1 |
| IFFD | file information data block 2 |
| IFFD | …… |
| IFFD | file information data block n |

FIG. 1d

| | |
|---|---|
| IFMF | file identifier |

FIG. 1e

| IFOD | Data length | | |
|---|---|---|---|
| IFAD | Data length | Update tag | File type |
| | Format corresponding to file type 1 | The number of files of file type 1 | ...... |
| IFCD | Data length | Creator string | |
| IFCT | Creation time | | |
| IFUD | Data length | Creation purpose string | |

FIG. 1f

| IFFD | Data length | Total number of files | Length of description of file 1 |
|---|---|---|---|
| | Update time of file 1 | File format of file 1 | Author of file 1 |
| | Data size of file 1 | GUID of file 1 | URL of file 1 |
| | ...... | | |

FIG. 1g

| IFID | Data length | The number of file information data blocks | Offset of file information data block 1 |
|---|---|---|---|
| | Length of file information data block 1 | The number of files recorded in file information data block 1 | ...... |

FIG. 1h

METHOD AND APPARATUS FOR STORING, READING, AND DISPLAYING PLURALITY OF MULTIMEDIA FILES

The present application claims the priority to a Chinese Patent Application No. 201610556249.X, filed with the China National Intellectual Property Administration on Jul. 13, 2016 and entitled "METHOD AND APPARATUS FOR STORING, READING, AND DISPLAYING PLURALITY OF MULTIMEDIA FILES", which is incorporated herein by reference in its entirety.

TECHNICAL FIELD

The present application relates to the field of multimedia technologies, and in particular, to a method and an apparatus for storing, reading, and displaying a plurality of multimedia files.

BACKGROUND

In the age of big data, network resource files (including multimedia files, etc.) are exploding, and such network resource files are generally distributed across the network or a local device. That is, they are stored in storage space addressed to various network addresses or stored in storage space addressed to various disk paths. When a user wants to view multimedia files of a certain type of interest, the user has to search for the files one by one, which is cumbersome and inconvenient for the user to view multimedia files of the certain type of interest.

Even with the help of search engines, it is still cumbersome for the user to search for the certain type of multimedia files of interest from a huge amount of data resources separately stored. This makes it inconvenient for the user to view different multimedia files of the certain type of interest. It is thus imperative to address the problem of how to effectively manage e.g., store, read, and display, a type of multimedia files.

SUMMARY

The embodiments of the present application disclose a method and an apparatus for storing, reading, and displaying a plurality of multimedia files, so as to store the plurality of different multimedia files as an integrated file for easy viewing by a user. The specific solutions are as follows.

In an aspect, an embodiment of the present application provides a method for storing a plurality of multimedia files. An integrated file structure is preset. The integrated file structure includes: a file identifier data block, an overall information data block, at least one file information data block, and an index information data block. The storing includes:

obtaining file description information of each of the plurality of multimedia files to be stored, determining a file identifier according to the file description information of each multimedia file, and storing the file identifier to the file identifier data block;

obtaining a file type and path information of each multimedia file to be stored, and storing the path information of each multimedia file to a file information data block corresponding to the file type of the multimedia file, and sequentially storing, according to the storage order of respective file information data blocks, a file type corresponding to each file information data block to the overall information data block;

determining storage location information of each file information data block, and storing the storage location information to the index information data block; and combining the file identifier data block, the overall information data block, the at least one file information data block, and the index information data block into an integrated file.

Optionally, after storing the file identifier to the file identifier data block, the method further includes: storing a preset integrated file management format identifier IFMF to the file identifier data block;

after storing the path information of each multimedia file to a file information data block corresponding to the file type of the multimedia file, the method further includes: storing a preset integrated file file description identifier IFFD to the file information data block;

after sequentially storing a file type corresponding to each file information data block to the overall information data block, the method further includes: storing a preset integrated file overall description identifier IFOD to the overall information data block; and after storing the storage location information to the index information data block, the method further includes: storing a preset integrated file index description identifier IFID to the index information data block.

Optionally, sequentially storing a file type corresponding to each file information data block to the overall information data block, includes:

sequentially storing a file type corresponding to each file information data block to an attribute data sub-block of the overall information data block.

The method further includes:

obtaining a file format corresponding to each file type, the number of files of each file type, and an updatability state of each multimedia file, and storing to the attribute data sub-block of the overall information data block; and recording information about a creator, creation time and creation purpose of the integrated file, storing the creator information in a creator data sub-block of the overall information data block; storing the creation time information in a creation time data sub-block of the overall information data block; and storing the creation purpose information in a creation purpose data sub-block of the overall information data block.

Optionally, after sequentially storing a file type corresponding to each file information data block to an attribute data sub-block of the overall information data block, the method further includes: storing a preset integrated file attribute description identifier IFAD to the attribute data sub-block;

after storing the creator information in the creator data sub-block of the overall information data block, the method further includes: storing a preset integrated file creator description identifier IFCD to the creator data sub-block;

after storing the creation time information in the creation time data sub-block of the overall information data block, the method further includes: storing a preset integrated file creation time identifier IFCT to the creation time data sub-block; and after storing the creation purpose information in the creation purpose data sub-block of the overall information data block, the method further includes: storing a preset integrated file usage description identifier IFUD to the creation purpose data sub-block.

Optionally, the path information includes a file sub-identifier and storage address information of a corresponding multimedia file.

The method further includes:

when new storage address information for the file sub-identifier of the multimedia file is detected and the updatability state for the multimedia file stored in the attribute data sub-block is updateable, updating path information corresponding to the file sub-identifier; and recording update time that the path information is updated, in the file information data block, and storing the update time to the overall information data block as update time of the integrated file.

Optionally, the method for storing a plurality of multimedia files provided by an embodiment of the present application further includes:

obtaining, by file types of the multimedia files, a file format, a file author, a file data size, and update time of each of the multimedia files to be stored and the number of multimedia files recorded in each of the file information data blocks, and storing to respective file information data blocks corresponding to the file types.

Optionally, the file identifier data block is located at a header of the preset integrated file structure; and determining storage location information of each file information data block, and storing the storage location information to the index information data block, includes:

determining a data size of each file information data block, determining a data offset of each file information data block relative to the file identifier data block according to the data size, and storing the data offset to the index information data block.

In another aspect, an embodiment of the present application provides a method for reading an integrated file stored according to the above method for storing a plurality of multimedia files.

The method includes:

obtaining a read instruction for the integrated file;

retrieving an index information data block of the integrated file in response to the read instruction;

determining each of file information data blocks according to location information of the file information data block stored in the index information data block;

determining a file type corresponding to each file information data block according to file types sequentially stored in the overall information data block;

determining a reading mode for each file information data block according to the file type for each file information data block; and reading a multimedia file corresponding to the path information stored in each file information data block in the reading mode for the file information data block.

Optionally, reading a multimedia file corresponding to the path information stored in each file information data block in the reading mode for the file information data block, includes:

sequentially reading, according to the storage order of the file information data blocks, a multimedia file corresponding to the path information stored in each file information data block in the reading mode for the file information data block.

Optionally, the file identifier data block stores a preset integrated file management format identifier IFMF, the file information data block stores a preset integrated file file description identifier IFFD, the overall information data block stores a preset integrated file overall description identifier IFOD, and the index information data block stores a preset integrated file index description identifier IFID;

retrieving an index information data block of the integrated file in response to the read instruction, includes: in response to the read instruction, searching for the index information data block of the integrated file according to the IFID to retrieve the index information data block of the integrated file;

determining a file type corresponding to each file information data block according to file types sequentially stored in the overall information data block, includes: searching for the overall information data block of the integrated file according to the IFOD, and obtaining file types for file information data blocks from the overall information data block, and determining a file type for each file information data block according to the file types sequentially stored in the overall information data block; and determining each file information data block according to location information of the file information data block stored in the index information data block, includes: determining all file information data blocks according to location information of each file information data block stored in the index information data block and the IFFD.

Optionally, the file identifier data block is located at a header of the preset integrated file structure.

The index information data block stores a data offset of each file information data block relative to the file identifier data block; and determining each file information data block according to location information of each file information data block stored in the index information data block, includes:

determining each file information data block according to the data offset stored in the index information data block.

Optionally, the overall information data block includes: an attribute data sub-block storing a file type, a file format corresponding to each file type, the number of files corresponding to each file type, and an updatability state of each multimedia file; a creator data sub-block storing information about the creator; a creation time data sub-block storing a creation time; and a creation purpose data sub-block storing a creation purpose; wherein the attribute data sub-block further stores a preset integrated file attribute description identifier IFAD; the creator data sub-block further stores a preset integrated file creator description identifier IFCD; the creation time data sub-block further stores a preset integrated file creation time identifier IFCT; and the creation purpose data sub-block further stores a preset integrated file usage description identifier IFUD.

The method further includes:

obtaining an attribute information read instruction for the integrated file;

finding the attribute data sub-block according to the IFAD, and reading the stored file types, the file format corresponding to each file type, the number of files corresponding to each file type, and the updatability state of each multimedia file;

finding the creator data sub-block according to the IFCD, and reading the stored creator information;

finding the creation time data sub-block according to the IFCT, and reading the stored creation time information; and finding the creation purpose data sub-block according to the IFUD, and reading the stored creation purpose information.

Optionally, each file information data block stores a file format, a file author, a file data size, update time of each of the recorded multimedia files, and the number of the multimedia files recorded itself.

The method further includes:

obtaining an attribute information read instruction for each multimedia file; and reading a file format, a file author, a file data size, update time of each of the multimedia files, and the number of multimedia files recorded itself, from each file information data block.

In another aspect, an embodiment of the present application provides a method for displaying an integrated file stored according to the above method for storing a plurality of multimedia files. The method includes:

obtaining a display instruction for the integrated file;

reading the integrated file in response to the display instruction;

reading the integrated file including: retrieving the index information data block of the integrated file; determining each file information data block according to location information of the file information data block stored in the index information data block; determining a file type corresponding to each file information data block according to the file types sequentially stored in the overall information data block; determining a reading mode for each file information data block according to the file type corresponding to the file information data block; and reading a multimedia file corresponding to the path information stored in each file information data block in the reading mode for the file information data block; and obtaining file content of the currently read multimedia file, and displaying the file content of the read multimedia file in a preset first display position on a display screen.

Optionally, reading a multimedia file corresponding to the path information stored in each file information data block in the reading mode for the file information data block, includes:

sequentially reading, in the storage order of the file information data blocks, a multimedia file corresponding to the path information stored in each file information data block in the reading mode for the file information data block.

Optionally, the file identifier data block stores a preset integrated file management format identifier IFMF, the file information data block stores a preset integrated file file description identifier IFFD, the overall information data block stores a preset integrated file overall description identifier IFOD, and the index information data block stores a preset integrated file index description identifier IFID;

retrieving an index information data block of the integrated file in response to the display instruction, includes: in response to the display instruction, searching for the index information data block of the integrated file according to the IFID to retrieve the index information data block of the integrated file;

determining a file type corresponding to each file information data block according to file types sequentially stored in the overall information data block, includes: searching for the overall information data block of the integrated file according to the IFOD, and obtaining file types for the file information data blocks from the overall information data block, and determining a file type for each file information data block according to the file types sequentially stored in the overall information data block; and determining each file information data block according to location information of the file information data block stored in the index information data block, includes: determining all file information data blocks according to location information of each file information data block stored in the index information data block and the IFFD.

Optionally, the overall information data block includes: an attribute data sub-block storing file types, a file format corresponding to each file type, the number of files corresponding to each file type, and an updatability state of each multimedia file; a creator data sub-block storing information about the creator; a creation time data sub-block storing a creation time; a creation purpose data sub-block storing a creation purpose; wherein the attribute data sub-block further stores a preset integrated file attribute description identifier IFAD; the creator data sub-block further stores a preset integrated file creator description identifier IFCD; the creation time data sub-block further stores a preset integrated file creation time identifier IFCT; and the creation purpose data sub-block further stores a preset integrated file usage description identifier IFUD.

The method further includes:

obtaining an attribute information display instruction for the integrated file;

finding the attribute data sub-block according to the IFAD, and reading the stored file types, the file format corresponding to each file type, the number of files corresponding to each file type, and the updatability state of each multimedia file for displaying;

finding the creator data sub-block according to the IFCD, and reading the stored creator information for displaying;

finding the creation time data sub-block according to the IFCT, and reading the stored creation time information for displaying; and finding the creation purpose data sub-block according to the IFUD, and reading the stored creation purpose information for displaying.

Optionally, each file information data block stores a file format, a file author, a file data size, update time corresponding to each of the recorded multimedia files, and the number of the multimedia files it recorded.

The method further includes:

obtaining an attribute information display instruction for each multimedia file; and reading a file format, a file author, a file data size, update time of each of the multimedia files, and the number of multimedia files, from each file information data block, for displaying.

In another aspect, an embodiment of the present application provides an apparatus for storing a plurality of multimedia files. An integrated file structure is preset. The integrated file structure includes: a file identifier data block, an overall information data block, at least one file information data block, and an index information data block. The apparatus includes:

a file identifier data block storage unit, configured for obtaining file description information of each of the plurality of multimedia files to be stored, determining a file identifier according to the file description information of each multimedia file, and storing the file identifier to the file identifier data block;

a file information data block storage unit, configured for obtaining a file type and path information of each multimedia file to be stored, and storing the path information of each multimedia file to a file information data block corresponding to the file type of the multimedia file;

an overall information data block storage unit, configured for sequentially storing, according to the storage order of respective file information data blocks, a file type corresponding to each file information data block to the overall information data block;

an index information data block storage unit, configured for determining storage location information of each file information data block, and storing the storage location information to the index information data block; and a combination unit, configured for combining the file identifier data block, the overall information data block, the at least one file information data block, and the index information data block into an integrated file.

In another aspect, an embodiment of the present application provides an apparatus for reading an integrated file stored according to the above method for storing a plurality of multimedia files. The apparatus includes:

an instruction obtaining module, configured for obtaining a read instruction for the integrated file;

a retrieval module, configured for retrieving an index information data block of the integrated file in response to the read instruction;

a first determination module, configured for determining each of file information data blocks according to location information of the file information data block stored in the index information data block;

a second determination module, configured for determining a file type corresponding to each file information data block according to file types sequentially stored in the overall information data block;

a third determination module, configured for determining a reading mode for each file information data block according to the file type for each file information data block; and a reading module, configured for reading a multimedia file corresponding to the path information stored in each file information data block in the reading mode for the file information data block.

In another aspect, an embodiment of the present application provides an apparatus for displaying an integrated file stored according to the above method for storing a plurality of multimedia files. The apparatus includes:

a display instruction obtaining unit, configured for obtaining a display instruction for the integrated file;

an integrated file reading unit, including a retrieval module, a first determination module, a second determination module, a third determination module and a reading module;

the retrieval module being configured for retrieving the index information data block of the integrated file in response to the display instruction;

the first determination module being configured for determining each file information data block according to location information of the file information data block stored in the index information data block;

the second determination module being configured for determining a file type corresponding to each file information data block according to the file types sequentially stored in the overall information data block;

the third determination module being configured for determining a reading mode for each file information data block according to the file type corresponding to the file information data block;

the reading module being configured for reading a multimedia file corresponding to the path information stored in each file information data block in the reading mode for the file information data block; and a content display unit, configured for obtaining file content of the currently read multimedia file, and displaying the file content of the read multimedia file in a preset first display position on a display screen.

Optionally, the apparatus further includes:

a progress bar display unit, configured for obtaining a reading progress of the currently read integrated file, and displaying a reading progress bar according to the reading progress, wherein the reading progress bar is provided with a type mark point, which is set according to position information of the file information data block stored in the index information data block.

Optionally, the path information includes a file sub-identifier of a multimedia file corresponding to the path information.

The apparatus further includes:

a directory display unit, configured for obtaining a file sub-identifier of a currently read multimedia file stored in the file information data block, and displaying the read file sub-identifier of the multimedia file stored in the file information data block, in a preset second display position on the display screen.

Optionally, the overall information data block includes: an attribute data sub-block storing file types, a file format corresponding to each file type, the number of files corresponding to each file type, and an updatability state of each multimedia file; a creator data sub-block storing information about the creator; a creation time data sub-block storing a creation time; a creation purpose data sub-block storing a creation purpose; wherein the attribute data sub-block further stores a preset integrated file attribute description identifier IFAD; the creator data sub-block further stores a preset integrated file creator description identifier IFCD; the creation time data sub-block further stores a preset integrated file creation time identifier IFCT; and the creation purpose data sub-block further stores a preset integrated file usage description identifier IFUD.

The display instruction obtaining module is further obtains an attribute information display instruction for the integrated file.

The apparatus further includes:

a first attribute information display unit, configured for
  finding the attribute data sub-block according to the IFAD, and reading the stored file types, the file format corresponding to each file type, the number of files corresponding to each file type, and the updatability state of each multimedia file for displaying;
  finding the creator data sub-block according to the IFCD, and reading the stored creator information for displaying;
  finding the creation time data sub-block according to the IFCT, and reading the stored creation time information for displaying; and
  finding the creation purpose data sub-block according to the IFUD, and reading the stored creation purpose information for displaying.

Optionally, each file information data block stores a file format, a file author, a file data size, update time corresponding to each of the recorded multimedia files, and the number of the multimedia files it recorded.

The display instruction obtaining module further obtains an attribute information display instruction for each multimedia file.

The apparatus further including:

a second attribute information display unit, configured for reading a file format, a file author, a file data size, update time of each of the multimedia files, and the number of multimedia files, from each file information data block, for displaying.

Optionally, the apparatus further includes an integrated file management unit, which includes a management instruction receiving module and an integrated file management module.

The management instruction receiving module is configured for obtaining a management instruction for the integrated file.

The integrated file management module is configured for obtaining file sub-identifiers of all multimedia files stored in the integrated file, displaying the obtained file sub-identifiers in a preset third display position on the display screen according to each of the file information data blocks of the integrated file, and displaying a management operation button in a preset fourth display position on the display screen; and after receiving an operation instruction through the management operation button, managing each multimedia file based on the operation instruction.

In another aspect, an embodiment of the present application provides an electronic device, which includes a processor and a memory. The memory is used to store executable program code. The processor implements the method for storing a plurality of multimedia files provided in the embodiments of the present application by executing the executable program code stored in the memory.

In another aspect, an embodiment of the present application provides a storage medium for storing executable program code that, when being executed, implements the method for storing a plurality of multimedia files provided in the embodiments of the present application.

In another aspect, an embodiment of the present application provides an electronic device, which includes a processor and a memory. The memory is used to store executable program code. The processor implements the method for reading an integrated file stored based on the method for storing a plurality of multimedia files provided in the embodiments of the present application, by executing the executable program code stored in the memory.

In another aspect, an embodiment of the present application provides a storage medium for storing executable program code that, when being executed, implements the method for reading an integrated file stored based on the method for storing a plurality of multimedia files provided in the embodiments of the present application.

In another aspect, an embodiment of the present application provides an electronic device, which includes a processor and a memory. The memory is used to store executable program code. The processor implements the method for displaying an integrated file stored based on the method for storing a plurality of multimedia files provided in the embodiments of the present application, by executing the executable program code stored in the memory.

In another aspect, an embodiment of the present application provides a storage medium for storing an executable program code that, when being executed, implements the method for displaying an integrated file stored based on the method for storing a plurality of multimedia files provided in the embodiments of the present application.

In the embodiments of the present application, the file description information of each of the plurality of multimedia files to be stored is obtained. A file identifier is determined according to the file description information of each of the multimedia file, and is stored to the file identifier data block. A file type and path information of each multimedia file to be stored are obtained, and the path information of each multimedia file is stored to a file information data block corresponding to the file type of the multimedia file. A file type corresponding to each file information data block is sequentially stored to the overall information data block according to the storage order of respective file information data blocks. The storage location information of each file information data block is determined, and is stored to the index information data block. The file identifier data block, the overall information data block, the at least one file information data block, and the index information data block are then combined into an integrated file. That is, the embodiments of the present application records a plurality of different multimedia files in an integrated file. An integrated file may be used to directly read a certain type of multimedia files. Since the path information of this type of multimedia files is stored in the integrated file, the multimedia files can be read and displayed in succession. Therefore, effective management of a certain type of different multimedia files is achieved, making it convenient for a user to view the files. Of course, not all of the advantages described above are required to practice any product or method of the present application.

BRIEF DESCRIPTION OF THE DRAWINGS

In order to more clearly explain the technical solutions in the present application or in the prior art, drawings required in the embodiments or the prior art will be briefly described below. Obviously, the drawings described below are for only some embodiments of the present application. Those of ordinary skills in the art can also obtain other drawings based on the drawings herein without any creative effort.

FIG. 1c is a schematic diagram of the structure of an integrated file stored according to the method in FIG. 1b;

FIG. 1d is a schematic diagram of the structure of an integrated file according to an embodiment of the present application;

FIG. 1e is a schematic diagram of the structure of a file identifier data block according to an embodiment of the present application;

FIG. 1f is a schematic diagram of the structure of an overall information data block according to an embodiment of the present application;

FIG. 1g is a schematic diagram of the structure of a file information data block according to an embodiment of the present application;

FIG. 1h is a schematic diagram of the structure of an index information data block according to an embodiment of the present application;

DETAILED DESCRIPTION

The technical solutions in the embodiments of the present application will now be clearly an fully described with reference to the accompanying drawings in the embodiments of the present application. Obviously, the described embodiments are only some instead of all of the embodiments of the present application. All other embodiments obtained by those of ordinary skill in the art based on the embodiments herein without making creative efforts fall into the scope of protection defined by the present application.

The embodiments of the present application provide a method and an apparatus for storing, reading, and displaying a plurality of multimedia files, so as to store the plurality of multimedia files as an integrated file for easy viewing by a user.

The method for storing a plurality of multimedia files provided by an embodiment of the present application is first introduced.

Figure 1A:
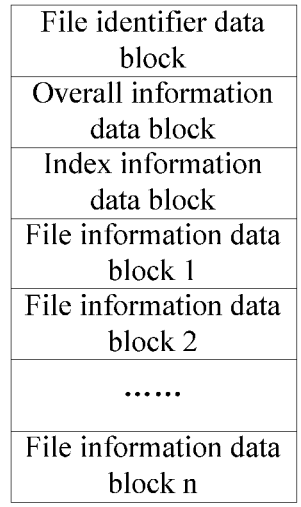
FIG. 1a is a schematic diagram of a data structure of an integrated file used in a method for storing a plurality of multimedia files according to an embodiment of the present application.

In an optional embodiment of the present application, in the method for storing a plurality of multimedia files, an integrated file structure is preset. As shown in FIG. 1*a*, the integrated file structure may include: a file identifier data block, an overall information data block, at least one file information data block, and an index information data block. The integrated file is formed by storing information about the plurality of multimedia files into respective data blocks.

That is to say, in the method for storing a plurality of multimedia files provided by the embodiment of the present application, at least one item of file information can form an integrated file based on the preset integrated file structure.

Figure 1B:
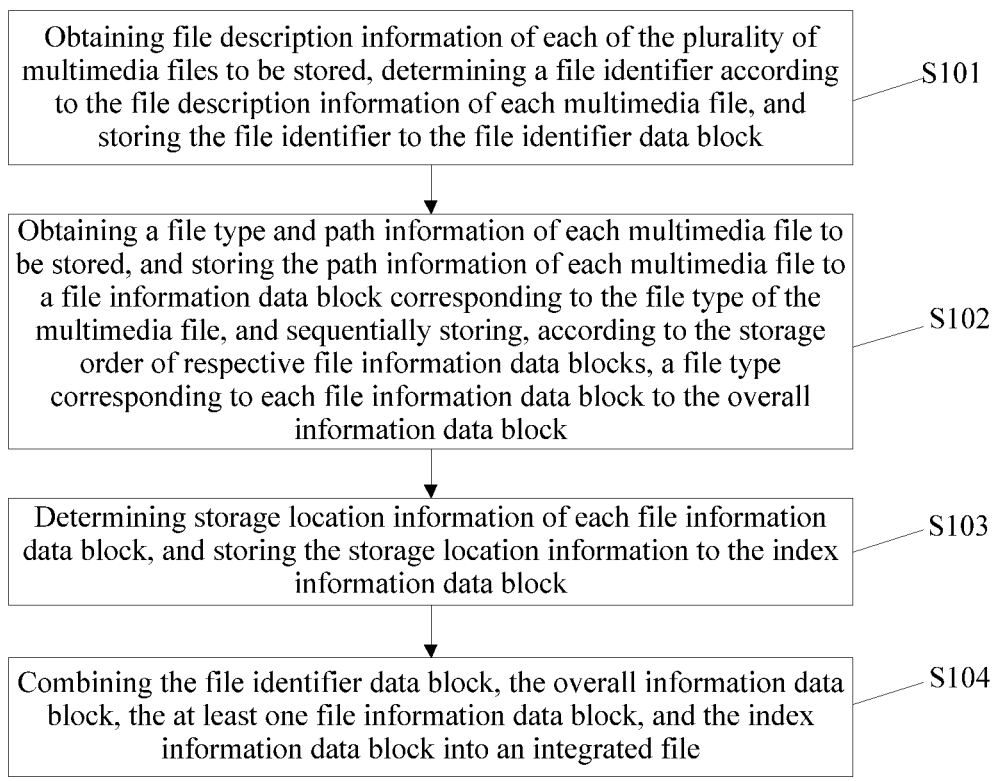
FIG. 1b is a schematic flowchart of a method for storing a plurality of multimedia files according to an embodiment of the present application.

As shown in FIG. 1*b*, the method for storing a plurality of multimedia files according to the embodiment of the present application may include the following steps:

S101: obtaining file description information of each of the plurality of multimedia files to be stored, determining a file identifier according to the file description information of each multimedia file, and storing the file identifier to the file identifier data block.

It can be understood that, for each multimedia file, the file description information describing the multimedia file is generally stored correspondingly to indicate a user the main content of the multimedia file. File description information of each of the plurality of multimedia files to be stored is obtained. A file identifier is determined according to the file description information of each of the multimedia files. The file identifier is stored to the file identifier data block. The file identifier may be manually entered, or may be determined by a storage device through specific calculation. For example, it may be an information fingerprint calculated by a predetermined algorithm, such as MD5, according to a "set of words" or "set of words+weights" shared by the file description information of the plurality of multimedia files. The information fingerprint may be four bytes long.

That is to say, in the case that the file identifier is determined by the device through the specific calculation, the determination process may include: determining a set of words shared by the file description information of the plurality of multimedia files, and then determining the file identifier using the predetermined algorithm according to the determined set of words or the determined set of words+ weights corresponding to the set of words. The predetermined algorithm may be the MD5 (Message Digest Algorithm). At this point, the file identifier may be the information fingerprint that can identify the plurality of multimedia files, wherein the information fingerprint may be four bytes long.

S102: obtaining a file type and path information of each multimedia file to be stored, and storing the path information of each multimedia file to a file information data block corresponding to the file type of the multimedia file, and sequentially storing, according to the storage order of respective file information data blocks, a file type corresponding to each file information data block to the overall information data block.

In an optional embodiment of the present application, in order to facilitate the management of the files, the file information data block corresponds to the file type. Moreover, in order to save the space for storing the integrated file, the integrated file correspondingly stores the path information of the multimedia file instead of the multimedia file itself. The file type and path information of each multimedia file to be stored is obtained, and the path information of the multimedia file is stored to the file information data block corresponding to the file type of the multimedia file. In order to facilitate subsequent reading of the files, a file type corresponding to each file information data block is determined, and the file types corresponding to respective file information data blocks are sequentially stored in the overall information data block according to the storage order of the file information data blocks. It can be understood that, when the storage order of the file information data blocks changes, the storage order of the file types also changes accordingly.

S103: determining storage location information of each file information data block, and storing the storage location information to the index information data block.

In an optional embodiment of the present application, in order to quickly locate a file information data block to quickly read a corresponding multimedia file when reading the integrated file in a later time, the storage location information of each file information data block can be determined and stored in the index information data block for locating file data sub-blocks corresponding to different multimedia file types.

S104: combining the file identifier data block, the overall information data block, the at least one file information data block, and the index information data block into an integrated file.

According to the preset integrated file structure, all of the data blocks are combined into the integrated file. As shown in FIG. 1*c*, the integrated file may include a file identifier data block, an overall information data block, an index information data block, and three file information data blocks. The file identifier data block stores the file identifier of the integrated file, such as the file name "XX publicity material". The overall information data block stores file types of the multimedia files contained in the integrated file, and the file types correspond to three file information data blocks respectively. The index information data block stores respective storage location information corresponding to the three file information data blocks. The three file information data blocks store path information of the multimedia files, which correspond to the three file types.

The embodiment of the present application is applied to determine file identifier according to the file description information of each of the multimedia files, and store the file identifier to the file identifier data block; obtain a file type and path information of each multimedia file to be stored, and store the path information the multimedia file to a file information data block corresponding to the file type of the multimedia file, and sequentially store the file types corresponding to each of the file information data blocks to the overall information data block according to the storage order of the file information data blocks; determine storage location information of each file information data block, and store the storage location information to the index information data block; and combine the above data blocks into an integrated file. This way, when a user reads a certain type of multimedia files, the user may directly open an integrated file. Since the path information of the certain type of multimedia files is stored in the integrated file, the stored plurality of multimedia files can be continuously read and then displayed. Therefore, effective management of a certain type of different multimedia files is achieved, which makes it convenient for a user to view.

In a specific implementation, in order to more easily distinguish the data blocks, a corresponding identifier may be added for each data block.

Specifically, after storing the file identifier to the file identifier data block, the method further includes: storing a preset integrated file management format identifier IFMF to the file identifier data block.

After storing the path information of each multimedia file to a file information data block corresponding to the file type of the multimedia file, the method further includes: storing a preset integrated file file description identifier IFFD to the file information data block.

After sequentially storing a file type corresponding to each file information data block to the overall information data block, the method further includes: storing a preset integrated file overall description identifier IFOD to the overall information data block.

After storing the storage location information to the index information data block, the method further includes: storing a preset integrated file index description identifier IFID to the index information data block.

It can be understood that, in order to facilitate subsequent reading of files, the data blocks included in the integrated file structure each has a corresponding preset identifier, which can be stored at the head of the corresponding data block. As shown in FIG. 1d, the file identifier data block has a preset integrated file management format identifier IFMF; each file information data block has a preset integrated file file description identifier IFFD; the overall information data block has a preset integrated file overall description identifier IFOD; and the index information data block has a preset integrated file index description identifier IFID.

In a specific implementation, the overall information data block may include an attribute data sub-block, a creator data sub-block, a creation time data sub-block, and a creation purpose data sub-block. Thus, sequentially storing a file type corresponding to each file information data block to the overall information data block, includes:

sequentially storing a file type corresponding to each file information data block to an attribute data sub-block of the overall information data block.

The method further includes:

obtaining a file format corresponding to each file type, the number of files of each file type, and an updatability state of each multimedia file, and storing to the attribute data sub-block of the overall information data block; and recording information about a creator, creation time and creation purpose of the integrated file, storing the creator information in a creator data sub-block of the overall information data block; storing the creation time information in a creation time data sub-block of the overall information data block; and storing the creation purpose information in a creation purpose data sub-block of the overall information data block.

In an optional embodiment of the present application, the overall information data block is used to store general information about the integrated file, for example, various file types (4 bytes, including but not limited to a text, document, audio, video, and picture), a file format corresponding to file type(s) (4 bytes, including but not limited to text-TEXT, document-DCMT, audio-AUDO, video-VIDO and picture-PICT), the number of files of each file type (4 bytes), and an updatability state of each multimedia file (4 bytes) (the above information is stored in the attribute data sub-block). The updatability state may be represented by an update flag, indicating whether the path information of the corresponding multimedia file can be updated. For example, the update is enabled when the update flag is a predetermined value, while the update is disabled when the update flag is not the predetermined value. Alternatively, the update is enabled by default (that is, it is updateable). In actual applications, the recorded number of files can be obtained in accordance with each of the file types or with each of the file formats.

In addition, the overall information data block may also store information about the creation of the integrated file, such as creator information (stored in the creator data sub-block), creation time information (stored in the creation time data sub-block) and creation purpose information (stored in the creation purpose data sub-block). It can be understood that each data sub-block can also store information about itself, such as the length of the data sub-block. The length may be represented with 4 bytes and in the unit of Byte.

The creator information may be stored in the creator data sub-block in the form of a string. The length of the string is variable, which may be equal to the total length of the creator data sub-block subtracting the length of other information stored in the creator data sub-block, for example, subtracting 8 bytes (including 4 bytes occupied by a preset integrated file creator description identifier IFCD that will be described later, and 4 bytes for recording the length of the creator data sub-block). The length of the string may be represented in the unit of Byte. The creation time stored in the creation time data sub-block can be represented by 8 bytes. The creation time can be with a precision of a millisecond. For example, the stored creation time may be in the format of: year, month, day, hour, minute, second, and millisecond, such as 0x2014103017304500, representing 17:30:45:00 on Oct. 30, 2014. The creation purpose information is stored in the creation purpose data sub-block in the form of a string. The length of the string is variable, which may be equal to the total length of the creation purpose data sub-block subtracting the length of other information stored in the creation purpose data sub-block, for example, subtracting 8 bytes (including 4 bytes occupied by a preset integrated file usage description identifier IFUD that will be described later, and 4 bytes for recording the length of the creation purpose data sub-block). The length of the string may be represented in the unit of Byte.

It can be understood that, for the overall information data block, each data sub-block included therein can be flexibly arranged.

In a specific implementation, in order to more easily distinguish each of the data sub-blocks included in the overall information data block to read the data sub-block, a corresponding identifier may be added to each data sub-block, the format of which may be as shown in FIG. 1e. FIG. 1e shows partial information stored in each data sub-block. Specifically, after sequentially storing a file type corresponding to each file information data block to an attribute data sub-block of the overall information data block, the method further includes: storing a preset integrated file attribute description identifier IFAD to the attribute data sub-block.

After storing the creator information in the creator data sub-block of the overall information data block, the method further includes: storing a preset integrated file creator description identifier IFCD to the creator data sub-block.

After storing the creation time information in the creation time data sub-block of the overall information data block, the method further includes: storing a preset integrated file creation time identifier IFCT to the creation time data sub-block.

After storing the creation purpose information in the creation purpose data sub-block of the overall information data block, the method further includes: storing a preset integrated file usage description identifier IFUD to the creation purpose data sub-block.

In an optional embodiment of the present application, in order to facilitate subsequent reading of the integrated file, each data sub-block in the overall information data block stores a preset identifier corresponding to the data sub-block, which is used for identify the corresponding data sub-block. The attribute data sub-block stores the preset integrated file attribute description identifier IFAD; the creator data sub-block stores the preset integrated file creator description identifier IFCD; the creation time data sub-block stores the preset integrated file creation time identifier IFCT; and the creation purpose data sub-block stores the preset integrated file usage description identifier IFUD.

In a specific implementation, the path information includes a file sub-identifier and storage address information of a corresponding multimedia file.

Since the storage address of the multimedia file can be updated, the method may further include:

when new storage address information for the file sub-identifier of the multimedia file is detected and the updatability state for the multimedia file stored in the attribute data sub-block is updateable, updating path information corresponding to the file sub-identifier; and recording update time that the path information is updated, in the file information data block, and storing the update time to the overall information data block as update time of the integrated file.

It can be understood that the multimedia file recorded in the integrated file may be stored locally in the device storing the integrated file, or may be stored on the network. When the multimedia file is stored locally in the device storing the integrated file, the path information may be a local path (including the file sub-identifier and storage address information of the multimedia file) indicating where the multimedia file is stored locally. When the multimedia file is stored on the network, the path information may be a URL (Uniform Resource Locator) and a GUID (Globally Unique Identifier) for the multimedia file.

In a specific implementation, the method further includes:

obtaining, by file types of the multimedia files, a file format, a file author, a file data size, and update time of each of the multimedia files to be stored and the number of multimedia files recorded in each of the file information data blocks, and storing to respective file information data blocks corresponding to the file types.

In an optional embodiment of the present application, in order to facilitate the user to understand the detailed information about each multimedia file, each file information data block may store detailed information about the multimedia file to be stored for the user to view, the detailed information may include such as the file format (4 bytes), the file author (4 bytes), and the file data size (4 bytes, i.e., the size of the file) and the update time (4 bytes) of the multimedia file. In addition, each file information data block also stores the number of the multimedia files (4 bytes) recorded therein to facilitate subsequent management of the stored multimedia files, as shown in FIG. 1g.

In a specific implementation, the file identifier data block is located at the header of the preset integrated file structure.

The process of determining storage location information of each file information data block, and storing the storage location information to the index information data block, includes:

determining a data size of each file information data block, determining a data offset of each file information data block relative to the file identifier data block according to the data size, and storing the data offset to the index information data block.

The file identifier data block is the identity information of the integrated file, and may be located at the header of the preset integrated file structure. Further, the data size of each file information data block is determined. The data offset of each file information data block relative to the file identifier data block is determined according to the data size, and stored in the index information data block for locating file data sub-blocks corresponding to different types of the multimedia files, so as to better locate a multimedia file. An exemplary diagram of the structure of the index information data block is as shown in FIG. 1h. The index information data block may also store the length of each file information data block and the number of multimedia files recorded in each file information data block.

Figure 2:
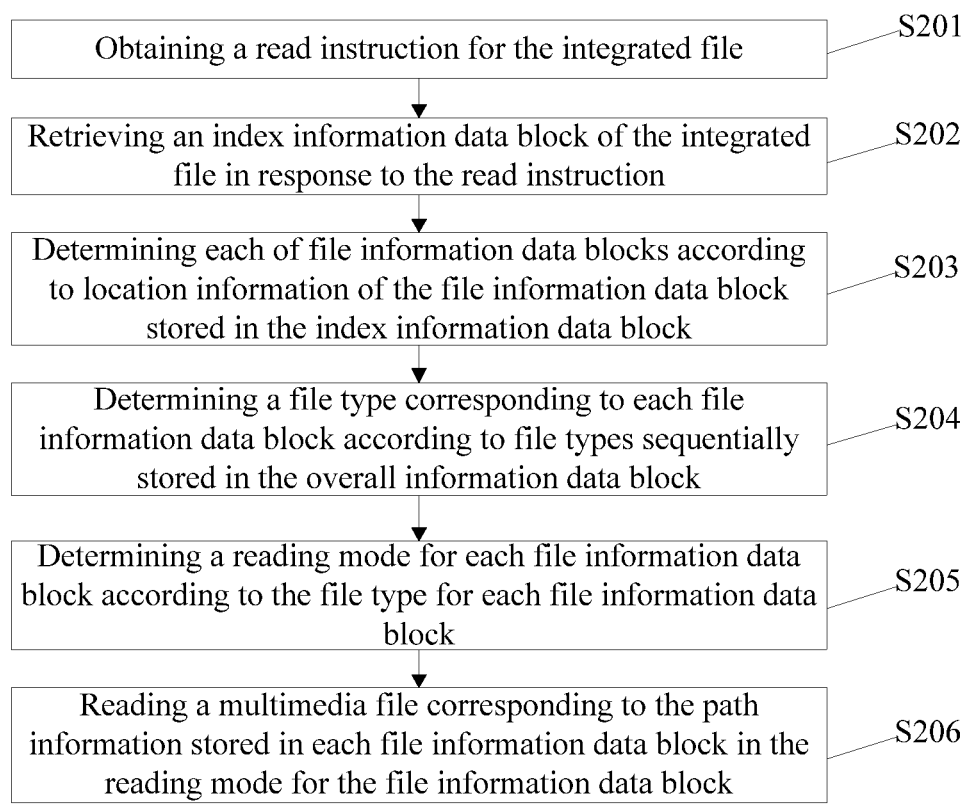
FIG. 2 is a schematic flowchart of a method for reading a plurality of multimedia files according to an embodiment of the present application.

In another aspect, an embodiment of the present application provides a method for reading an integrated file stored according to the above method for storing a plurality of multimedia files. As shown in FIG. 2, the method includes:

S201: obtaining a read instruction for the integrated file.

The read instruction may be issued by a click operation on the integrated file. The read instruction for the integrated file is obtained, for reading a multimedia file recorded in the integrated file (by reading the path information and accessing the multimedia file corresponding to the path information). The click operation may be a double-click or a click operation or the like.

S202: retrieving an index information data block of the integrated file in response to the read instruction;

S203: determining each of file information data blocks according to location information of the file information data block stored in the index information data block;

It can be understood that, after the read instruction for the integrated file is obtained, the index information data block of the integrated file is retrieved. The location information of each stored file information data block is read from the index information data block. The location information is used to locate each file information data block, and then each file information data block is determined.

S204: determining a file type corresponding to each file information data block according to file types sequentially stored in the overall information data block;

In an optional embodiment of the present application, the sequentially stored file types are read from the overall information data block of the integrated file. The storage order of the file types correspond to the storage order of respective file information data blocks. With both S203 and S204, a file type corresponding to each file information data block can be determined. It can be understood that S203 and S204 may be performed simultaneously, or performed sequentially in any order.

S205: determining a reading mode for each file information data block according to the file type for each file information data block;

In an optional embodiment of the present application, the file information data blocks correspond to different file types, and different file types correspond to different reading modes. Therefore, it is required to determine a reading mode for each file information data block according to the file type corresponding to this file information data block. For example, the mode for reading a video file corresponds to the reading manner by an existing video player, the mode for reading an audio corresponds to the reading mode by an audio player, the mode for reading texts corresponds to the mode reading a PDF, WORD or e-book file, and the mode for reading a picture corresponds to the mode for reading slides, and so on.

S206: reading a multimedia file corresponding to the path information stored in each file information data block in the reading mode for the file information data block.

Specifically, since each file information data block stores the path information, it is necessary to access the path information to read a multimedia file corresponding to the path information. The multimedia file corresponding to the path information stored in each file information data block is read according to the reading mode for this file information data block.

In addition, in an optional embodiment of the present application, the integrated file may be stored somewhere in the network, such as a media database in a network. If the media database stores both an integrated file and a single multimedia file, upon receiving a file search instruction, if a single multimedia file is found to be corresponding to the file search instruction by using the B$^+$ tree retrieval method in the prior art, the media database may directly output the path information of the multimedia file.

To search for an integrated file by using the B$^+$ tree search method, the file identifier data block of the integrated file may be analyzed first, and it is determined whether the file identifier stored in the file identifier data block of the integrated file matches the file identifier carried in the file search instruction. In the case of matching, a file information data block of the integrated file can be analyzed to obtain a GUID stored in the file information data block. The URL of a corresponding multimedia file is then obtained according to the GUID, and is compared to the file identifier carried in the file search instruction. If they match with each other, the path information of the integrated file is output. The file identifier carried in the file search instruction may be a URL corresponding to a multimedia file.

The embodiments of the present application is applied to obtain a read instruction for the integrated file; retrieve an index information data block of the integrated file in response to the read instruction; determine each of file information data blocks according to location information of the file information data block stored in the index information data block; determine a file type corresponding to each file information data block according to file types sequentially stored in the overall information data block; determine a reading mode for each file information data block according to the file type for each file information data block; and read a multimedia file corresponding to the path information stored in each file information data block in the reading mode for the file information data block. The plurality of multimedia files recorded in the integrated file can be read, which is convenient for the user to view.

In a specific implementation, reading a multimedia file corresponding to the path information stored in each file information data block in the reading mode for the file information data block, includes:

sequentially reading, according to the storage order of the file information data blocks, a multimedia file corresponding to the path information stored in each file information data block in the reading mode for the file information data block.

The multimedia file corresponding to the path information stored in each file information data block may be sequentially read in the storage order of the file information data blocks. That is, after one file information data block is read, the next file information data block is read in turn. Further, the path information stored in each file information data block is sequentially read according to the storage order of the path information.

In a specific implementation, the file identifier data block stores a preset integrated file management format identifier IFMF, the file information data block stores a preset integrated file file description identifier IFFD, the overall information data block stores a preset integrated file overall description identifier IFOD, and the index information data block stores a preset integrated file index description identifier IFID.

The process of retrieving an index information data block of the integrated file in response to the read instruction includes: in response to the read instruction, searching for the index information data block of the integrated file according to the IFID to retrieve the index information data block of the integrated file;

determining a file type corresponding to each file information data block according to file types sequentially stored in the overall information data block includes: searching for the overall information data block of the integrated file according to the IFOD, and obtaining file types for file information data blocks from the overall information data block, and determining a file type for each file information data block according to the file types sequentially stored in the overall information data block; and determining each file information data block according to location information of the file information data block stored in the index information data block includes: determining all file information data blocks according to location information of each file information data block stored in the index information data block and the IFFD.

It can be understood that each data block of the integrated file has a corresponding preset identifier stored therein. A corresponding data block can be determined by the corresponding preset identifier, and the stored information then can be read from the corresponding data block.

In a specific implementation, the file identifier data block is located at a header of the preset integrated file structure.

The index information data block stores a data offset of each file information data block relative to the file identifier data block.

The process of determining each file information data block according to location information of each file information data block stored in the index information data block, includes:

determining each file information data block according to the data offset stored in the index information data block.

In an optional embodiment of the present application, the index data block stores a data offset of each file information data block relative to the file identifier data block located at the header of the preset integrated file structure. The data offset can be used to quickly locate each file information data block, and the multimedia file corresponding to the path information stored in each file information data block can be quickly read.

In a specific implementation, the overall information data block includes: an attribute data sub-block storing a file type, a file format corresponding to each file type, the number of files corresponding to each file type, and an updatability state of each multimedia file; a creator data sub-block storing information about the creator; a creation time data sub-block storing a creation time; and a creation purpose data sub-block storing a creation purpose.

The attribute data sub-block further stores a preset integrated file attribute description identifier IFAD; the creator data sub-block further stores a preset integrated file creator description identifier IFCD; the creation time data sub-block further stores a preset integrated file creation time identifier IFCT; and the creation purpose data sub-block further stores a preset integrated file usage description identifier IFUD.

The method further includes:
obtaining an attribute information read instruction for the integrated file;
finding the attribute data sub-block according to the IFAD, and reading the stored file types, the file format corresponding to each file type, the number of files corresponding to each file type, and the updatability state of each multimedia file;
finding the creator data sub-block according to the IFCD, and reading the stored creator information;
finding the creation time data sub-block according to the IFCT, and reading the stored creation time information; and
finding the creation purpose data sub-block according to the IFUD, and reading the stored creation purpose information.

Specifically, when an attribute information read instruction for an integrated file is obtained, the data sub-blocks included in the overall information data block may be determined according to preset identifiers corresponding to respective data sub-blocks included in the overall information data block, and the information stored therein may be read. Further, it is possible to display or process, such as modify, the read information, and the like, which are all possible.

In a specific implementation, each file information data block stores a file format, a file author, a file data size, update time of each of the recorded multimedia files, and the number of the multimedia files it recorded.

The method further includes:
obtaining an attribute information read instruction for each multimedia file; and
reading a file format, a file author, a file data size, update time of each of the multimedia files, and the number of multimedia files recorded itself, from each file information data block.

It can be understood that when the user needs to read the attribute information of each multimedia file, the attribute information read instruction for each multimedia file may be obtained first. In response to the attribute information read instruction for each multimedia file, then the file format, file author, file data size, update time of each multimedia file, and the number of multimedia files stored in each file information data block are obtained respectively from the file information data block. Further, it is possible to display or process, such as modify, the read information, and the like, which are all possible.

Figure 3:
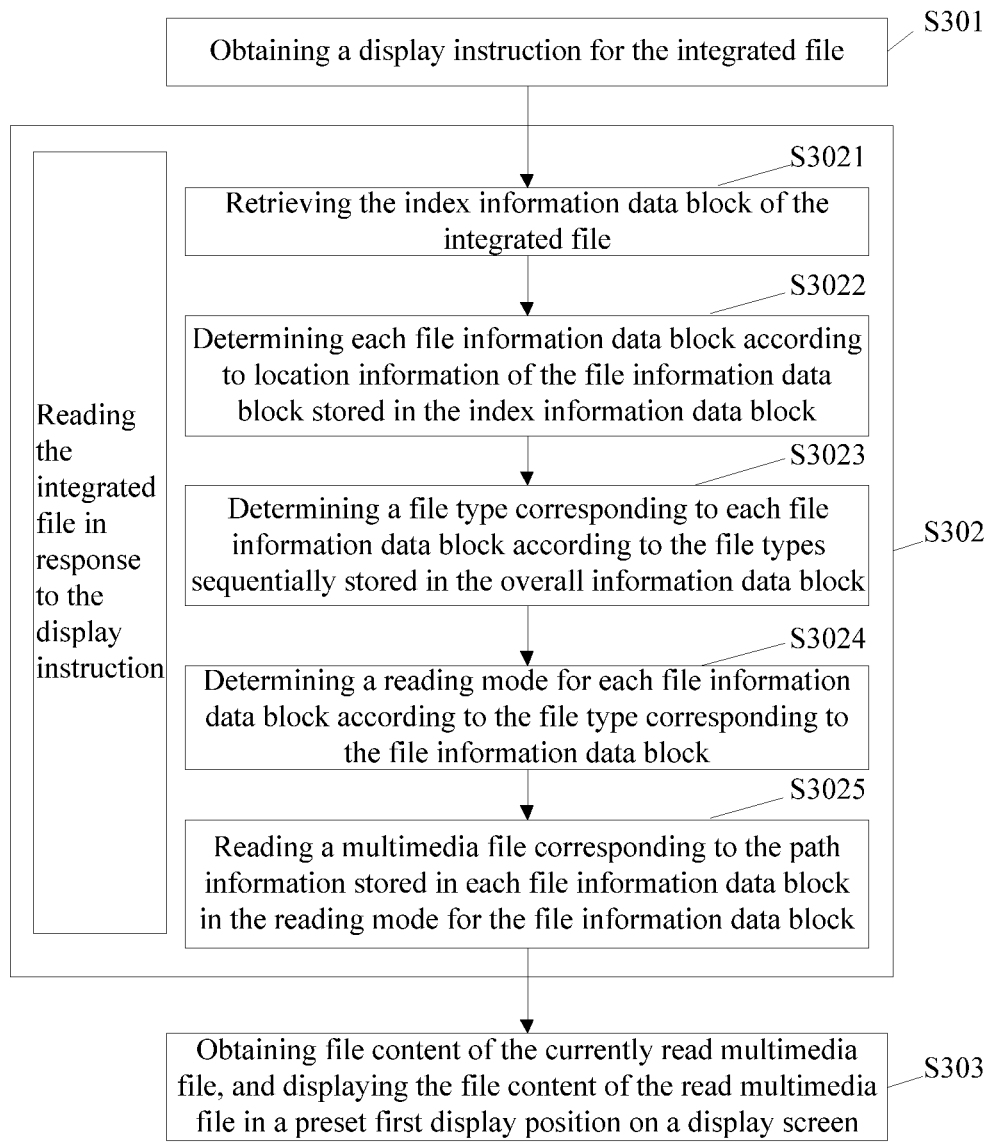
FIG. 3 is a schematic flowchart of a method for displaying a plurality of multimedia files according to an embodiment of the present application.

In another aspect, an embodiment of the present application provides a method for displaying an integrated file stored according to the above method for storing a plurality of multimedia files. As shown in FIG. 3, the method includes:

S301: obtaining a display instruction for the integrated file.

S302: reading the integrated file in response to the display instruction.

In FIG. 3, the step S302 of reading the integrated file specifically includes the following steps:

S3021: retrieving the index information data block of the integrated file;

S3022: determining each file information data block according to location information of the file information data block stored in the index information data block;

S3023: determining a file type corresponding to each file information data block according to the file types sequentially stored in the overall information data block;

S3024: determining a reading mode for each file information data block according to the file type corresponding to the file information data block; and S3025: reading a multimedia file corresponding to the path information stored in each file information data block in the reading mode for the file information data block.

S303: obtaining file content of the currently read multimedia file, and displaying the file content of the read multimedia file in a preset first display position on a display screen.

In an optional embodiment of the present application, after the display instruction for the integrated file is obtained, the integrated file may be read. The file content of the currently read multimedia file is obtained, and the file content of the read multimedia file is displayed in the preset first display position on the display screen. The process of reading the integrated file is substantially the same as the process of reading the integrated file previously described. The display instruction for the integrated file is different from the read instruction for the integrated file. For example, when the read instruction is issued by a click operation, the display instruction may be issued by a double-click operation, and the like.

With the embodiment of the present application, the read file content of the multimedia file recorded in the integrated file may be displayed to the user for viewing, so that the user can quickly view the multimedia files of the desired type.

In a specific implementation, reading a multimedia file corresponding to the path information stored in each file information data block in the reading mode for the file information data block, includes:

sequentially reading, in the storage order of the file information data blocks, a multimedia file corresponding to the path information stored in each file information data block in the reading mode for the file information data block.

The multimedia file corresponding to the path information stored in each file information data block may be sequentially read in the storage order of the file information data blocks. That is, after one file information data block is read, the next file information data block is read in turn. Further, the path information stored in each file information data block is sequentially read according to the storage order of the path information.

In a specific implementation, the file identifier data block stores a preset integrated file management format identifier IFMF, the file information data block stores a preset integrated file file description identifier IFFD, the overall information data block stores a preset integrated file overall description identifier IFOD, and the index information data block stores a preset integrated file index description identifier IFID.

The process of retrieving an index information data block of the integrated file in response to the display instruction, includes: in response to the display instruction, searching for the index information data block of the integrated file according to the IFID to retrieve the index information data block of the integrated file;

determining a file type corresponding to each file information data block according to file types sequentially stored in the overall information data block, includes: obtaining, searching for the overall information data block of the integrated file according to the IFOD, and obtaining file types for the file information data blocks from the overall information data block, and determining a file type for each file information data block according to the file types sequentially stored in the overall information data block; and determining each file information data block according to location information of the file information data block stored in the index information data block, includes: determining all file information data blocks according to location information of each file information data block stored in the index information data block and the IFFD.

It can be understood that the file content of the multimedia file needs to be read before displaying the content of the read multimedia file. Each data block of the integrated file stores a corresponding preset identifier. The data block can be determined through the corresponding preset identifier, and the stored information is then read from the data block. This achieves reading a multimedia file corresponding to the path information stored in the file information data block, and then displaying the file content of the read multimedia file.

That is to say, each data block of the integrated file can be located by a corresponding preset identifier stored in the data block, and the information stored in the data block can be then read. The file information data block can be located by reading the information stored in each data block in the integrated file, so that the multimedia file corresponding to the path information stored in the file information data block can be read, and the file content of the multimedia file can be displayed.

In a specific implementation, the overall information data block includes: an attribute data sub-block storing a file type, a file format corresponding to each file type, the number of files corresponding to each file type, and an updatability state of each multimedia file; a creator data sub-block storing the creator information; a creation time data sub-block storing a creation time; and a creation purpose data sub-block storing the creation purpose.

The attribute data sub-block further stores a preset integrated file attribute description identifier IFAD; the creator data sub-block further stores a preset integrated file creator description identifier IFCD; the creation time data sub-block further stores a preset integrated file creation time identifier IFCT; and the creation purpose data sub-block further stores a preset integrated file usage description identifier IFUD.

The method further includes:

obtaining an attribute information display instruction for the integrated file;

finding the attribute data sub-block according to the IFAD, and reading the stored file types, the file format corresponding to each file type, the number of files corresponding to each file type, and the updatability state of each multimedia file for displaying;

finding the creator data sub-block according to the IFCD, and reading the stored creator information for displaying;

finding the creation time data sub-block according to the IFCT, and reading the stored creation time information for displaying; and finding the creation purpose data sub-block according to the IFUD, and reading the stored creation purpose information for displaying.

In an optional embodiment of the present application, each data sub-block included in the overall information data block is located according to a preset identifier corresponding to the of the data sub-block, and the information stored in the data sub-block is then read and displayed.

In a specific implementation, each file information data block stores a file format, a file author, a file data size, update time corresponding to each of the recorded multimedia files, and the number of the multimedia files it recorded.

The method further includes:

obtaining an attribute information display instruction for each multimedia file; and reading a file format, a file author, a file data size, update time of each of the multimedia files, and the number of multimedia files, from each file information data block, for displaying.

Specifically, when the user needs to read the attribute information of each multimedia file, the attribute information read instruction for each multimedia file is obtained first. In response to the attribute information read instruction for each multimedia file, the file format, file author, file data size, and update time of each multimedia file, and the number of multimedia files stored in each file information data block are read from the file information data block. It can be understood that the attribute information display instruction may request only one multimedia file. That is, the file format, file author, file data size and update time of only one certain multimedia file are displayed. It may request all multimedia files stored in one file information data block. It may also request all multimedia files stored in all file information data blocks.

Figure 4:
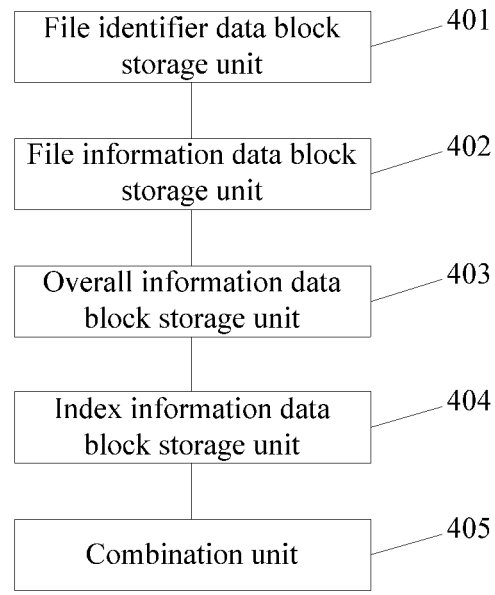
FIG. 4 is a schematic flowchart of an apparatus for storing a plurality of multimedia files according to an embodiment of the present application.

Corresponding to the above method embodiment, an embodiment of the present application provides an apparatus for storing a plurality of multimedia files, which has a preset integrated file structure. The integrated file structure includes: a file identifier data block, an overall information data block, at least one file information data block, and an index information data block, as shown in FIG. 4. The apparatus may include:

a file identifier data block storage unit 401, configured for obtaining file description information of each of the plurality of multimedia files to be stored, determining a file identifier according to the file description information of each multimedia file, and storing the file identifier to the file identifier data block;

a file information data block storage unit 402, configured for obtaining a file type and path information of each multimedia file to be stored, and storing the path information of each multimedia file to a file information data block corresponding to the file type of the multimedia file;

an overall information data block storage unit 403, configured for sequentially storing, according to the storage order of respective file information data blocks, a file type corresponding to each file information data block to the overall information data block;

an index information data block storage unit 404, configured for determining storage location information of each file information data block, and storing the storage location information to the index information data block;

a combination unit 405, configured for combining the file identifier data block, the overall information data block, the at least one file information data block, and the index information data block into an integrated file.

The embodiment of the present application is applied to determine file identifier according to the file description information of each of the multimedia files, and store the file identifier to the file identifier data block; obtain a file type and path information of each multimedia file to be stored, and store the path information the multimedia file to a file information data block corresponding to the file type of the multimedia file, and sequentially store the file types corresponding to each of the file information data blocks to the overall information data block according to the storage order of the file information data blocks; determine storage location information of each file information data block, and store the storage location information to the index information data block; and combine the above data blocks into an integrated file. This way, when a user reads a certain type of multimedia files, the user may directly open an integrated file. Since the path information of the certain type of multimedia files is stored in the integrated file, the stored plurality of multimedia files can be continuously read and then displayed. Therefore, effective management of a certain type of different multimedia files is achieved, which makes it convenient for a user to view.

Figure 5:
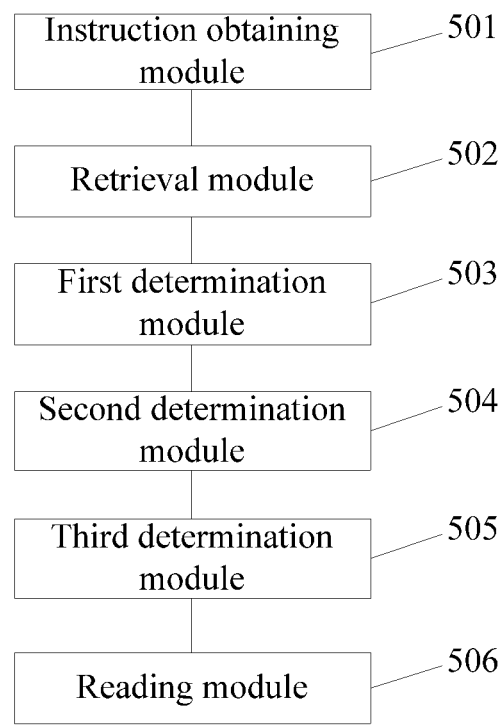
FIG. 5 is a schematic flowchart of an apparatus for reading a plurality of multimedia files according to an embodiment of the present application.

Corresponding to the above method embodiment, an embodiment of the present application provides an apparatus for reading an integrated file stored according to the method for storing a plurality of multimedia files, as shown in FIG. 5. The apparatus may include:

an instruction obtaining module 501, configured for obtaining a read instruction for the integrated file;

a retrieval module 502, configured for retrieving an index information data block of the integrated file in response to the read instruction;

a first determination module 503, configured for determining each of file information data blocks according to location information of the file information data block stored in the index information data block;

a second determination module 504, configured for determining a file type corresponding to each file information data block according to file types sequentially stored in the overall information data block;

a third determination module 505, configured for determining a reading mode for each file information data block according to the file type for each file information data block; and a reading module 506, configured for reading a multimedia file corresponding to the path information stored in each file information data block in the reading mode for the file information data block.

The embodiments of the present application is applied to obtain a read instruction for the integrated file; retrieve an index information data block of the integrated file in response to the read instruction; determine each of file information data blocks according to location information of the file information data block stored in the index information data block; determine a file type corresponding to each file information data block according to file types sequentially stored in the overall information data block; determine a reading mode for each file information data block according to the file type for each file information data block; and read a multimedia file corresponding to the path information stored in each file information data block in the reading mode for the file information data block. The plurality of multimedia files recorded in the integrated file can be read, which is convenient for the user to view.

Figure 6:
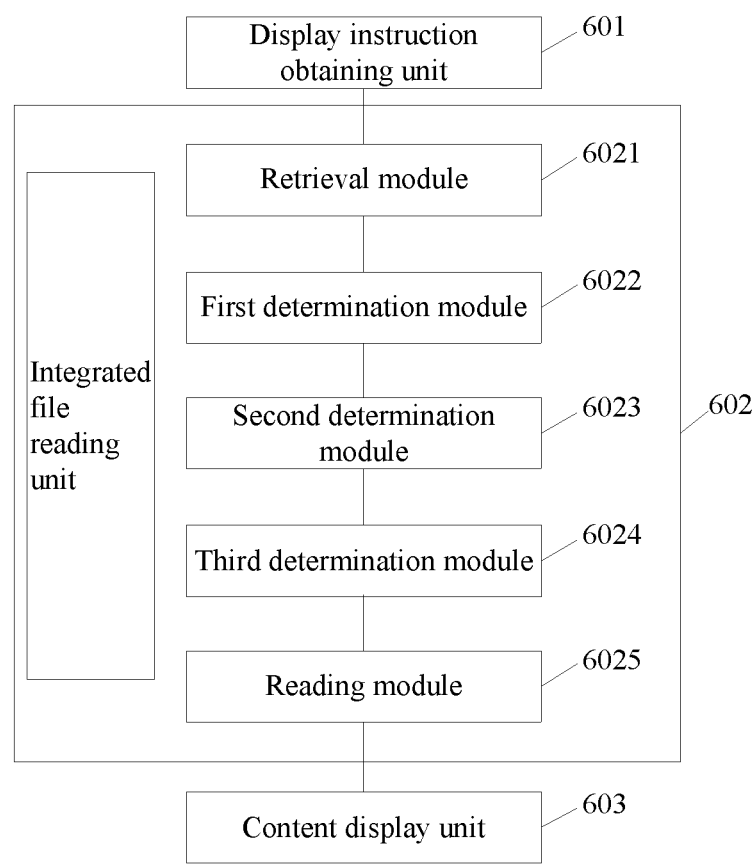
FIG. 6 is a schematic flowchart of an apparatus for displaying a plurality of multimedia files according to an embodiment of the present application.

Corresponding to the above method embodiment, an embodiment of the present application provides an apparatus for displaying an integrated file stored according to the method for storing a plurality of multimedia files, as shown in FIG. 6. The apparatus may include:

a display instruction obtaining module 601, configured for obtaining a display instruction for the integrated file;

an integrated file reading unit 602, including: a retrieval module 6021, a first determination module 6022, a second determination module 6023, a third determination module 6024, and a reading module 6025; wherein the retrieval module 6021 is configured for retrieving the index information data block of the integrated file in response to the display instruction;

the first determination module 6022 is configured for determining each file information data block according to location information of the file information data block stored in the index information data block;

the second determination module 6023 is configured for determining a file type corresponding to each file information data block according to the file types sequentially stored in the overall information data block;

the third determination module 6024 is configured for determining a reading mode for each file information data block according to the file type corresponding to the file information data block;

the reading module 6025 is configured for reading a multimedia file corresponding to the path information stored in each file information data block in the reading mode for the file information data block; and a content display unit 603, configured for obtaining file content of the currently read multimedia file, and displaying the file content of the read multimedia file in a preset first display position on a display screen.

It can be understood that the display apparatus can display all multimedia files corresponding to the path information stored in the integrated file. The file types of the multimedia files may be different, and the way of reading the multimedia files of different file types may be different. Further, the file formats of the multimedia files may vary, and thus, the way of reading the multimedia files may be different. The display apparatus provided by the embodiments of the present application can switch between different reading manners according to the file types of or even different file formats of the multimedia files, and display the read file contents. The file formats of the multimedia files that the display apparatus supports are shown in Table 1.

TABLE 1

| File type | Supported file formats |
| --- | --- |
| Video file | RMVB、AVI、FLV、WMV、MP4、MPV、M4V、3GP、MOV、ASF . . . |
| Audio file | MP3、WAV、M4A、AAC、CAF . . . |
| Document file | PDF/RTFD、DOC/DOCX、XLS/XLSX、PPT/PPTX、CSV、CHM . . . |
| Text file | HTM/HTML、TXT . . . |
| Picture | JPG/JPEG、GIF、PNG、TIFF、BMP、TGA . . . |

While reading and displaying multimedia files corresponding to the path information stored in the integrated file, the multimedia files may be downloaded by using a P2P method (including but not limited to supporting 5 download channels), and the more front the path information corresponding to the multimedia file is stored, the earlier the multimedia file will be downloaded. It can be understood that the multimedia file corresponding to the path information stored in the integrated file may not be downloaded during the read and display.

Figure 7:
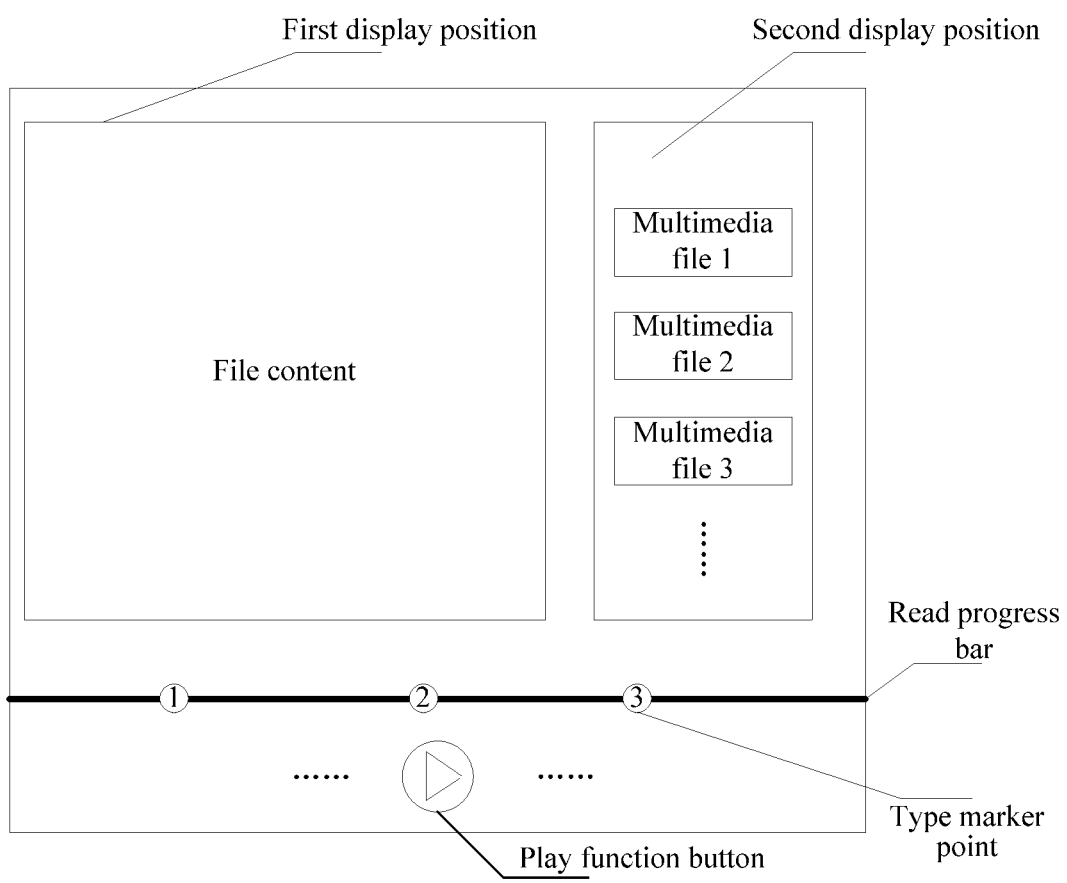
FIG. 7 is a schematic diagram of a display interface in the display apparatus shown in FIG. 6.
Figure 8:
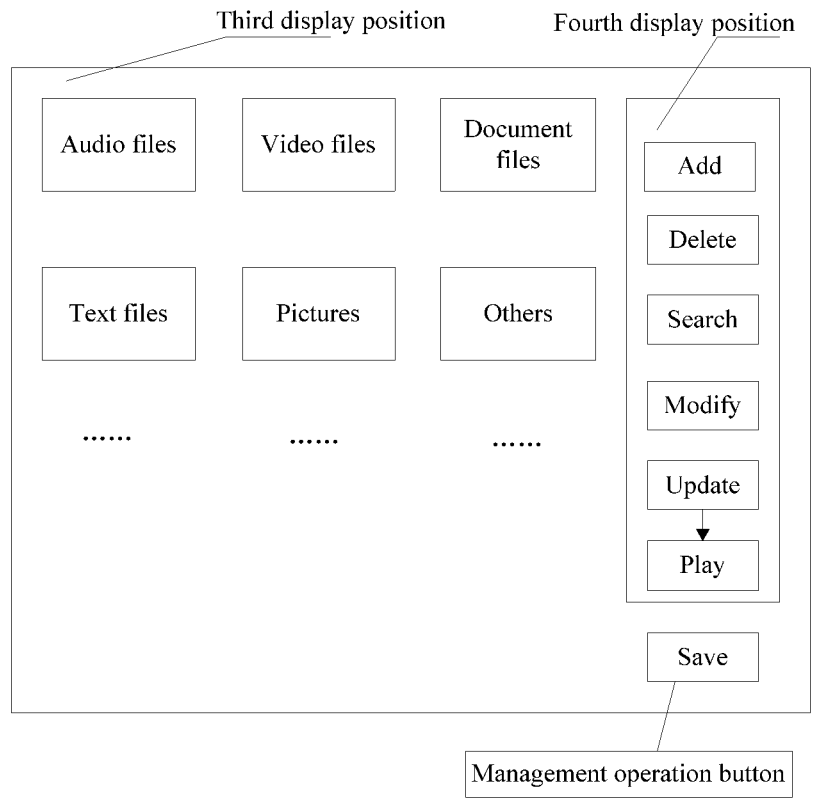
FIG. 8 is a schematic diagram of another display interface in the display apparatus shown in FIG. 6.

The display apparatus may provide two operation modes, one is a display view mode, and an exemplary interface for this mode is as shown in FIG. 7. The other is a management view mode, and an exemplary interface for this mode is as shown in FIG. 8.

In the display view mode, the display interface is as shown in FIG. 7. The display interface may include a first display position for displaying the file content of the currently read multimedia file, and a second display position for displaying the file sub-identification of the read multimedia file which is stored in the file information data block.

The display view mode can be automatically opened after obtaining the file content of the currently read multimedia file (and may be after being buffered for a certain time, generally 20 seconds by default), that is, the file content of the read multimedia file is displayed at the preset first display position on the display screen. The management view mode may be started after all the multimedia files corresponding to the path information stored in the integrated file are all downloaded, or it can be initiated by a user. Under the management view mode, the user can modify the integrated file according to his or her needs.

In the display view mode, as shown in FIG. 7, the display interface includes a play function button. The display apparatus can support common functions such as pause, start, normal play, fast forward, slow forward, and drag and drop, through the play button function button and other function buttons. A video or audio file can be displayed without interruption according to the content of the file. Pictures may be displayed in a similar fashion to a slideshow, and the display duration may be preset, for example, each picture is displayed for 2 seconds by default, and the next picture will be displayed after 2 seconds. The text or document files may be displayed in a similar fashion as displaying e-books. Each page is displayed for 30 seconds by default and the next page will be shown after 30 seconds, or the subsequent file content are displayed in a scrolling manner. The duration for displaying a picture, the text, or document file may be set by the user according to his or her viewing habits. Also, the display font, font size, and scroll speed for text and document files can be adjusted. During the displaying, when the apparatus cannot obtain a multimedia file (due to invalid path information or network failure, etc.), the apparatus will skip the multimedia file and go directly to the multimedia file corresponding to the next path information.

Applying the embodiment of the present application, the file content of the multimedia files recorded in the read integrated file may be displayed to the user, so that the user can quickly view the multimedia files of a desired type.

In the interface shown in FIG. 7, a reading progress bar is further included. The display apparatus further includes:

a progress bar display unit, configured for obtaining a reading progress of the currently read integrated file, and displaying a reading progress bar according to the reading progress, wherein the reading progress bar is provided with a type mark point, which is set according to position information of the file information data block stored in the index information data block.

It can be understood that, in order to facilitate the user's selection of the multimedia file and a selective display by drag, as shown in FIG. 7, mark points (type mark points) are provided on the reading progress bar, which is set according to the position information of the file information data block stored in the index information data block.

In a specific implementation, the path information includes a file sub-identifier of a multimedia file corresponding to the path information.

In the interface shown in FIG. 7, a second display position is included. The display apparatus further includes:

a directory display unit, configured for obtaining a file sub-identifier of a currently read multimedia file stored in the file information data block, and displaying the read file sub-identifier of the multimedia file stored in the file information data block, in a preset second display position on the display screen.

In an optional embodiment of the present application, a currently read file sub-identifier of a multimedia file stored in the file information data block is obtained. As shown in FIG. 7, the read file sub-identifier of the multimedia file stored in the file information data block is displayed in the preset second display position on the display screen.

In a specific implementation, the overall information data block includes: an attribute data sub-block storing file types, a file format corresponding to each file type, the number of files corresponding to each file type, and an updatability state of each multimedia file; a creator data sub-block storing information about the creator; a creation time data sub-block storing a creation time; a creation purpose data sub-block storing a creation purpose.

The attribute data sub-block further stores a preset integrated file attribute description identifier IFAD; the creator data sub-block further stores a preset integrated file creator description identifier IFCD; the creation time data sub-block further stores a preset integrated file creation time identifier IFCT; and the creation purpose data sub-block further stores a preset integrated file usage description identifier IFUD.

The display instruction obtaining unit further obtains an attribute information display instruction for the integrated file. For example, in the interface shown in FIG. 7, an integrated file attribute information display button may be additionally provided, and the display instruction obtaining unit obtains an instruction through the button.

The display apparatus further includes:

a first attribute information display unit, configured for finding the attribute data sub-block according to the IFAD, and reading the stored file types, the file format corresponding to each file type, the number of files corresponding to each file type, and the updatability state of each multimedia file for displaying;

finding the creator data sub-block according to the IFCD, and reading the stored creator information for displaying;

finding the creation time data sub-block according to the IFCT, and reading the stored creation time information for displaying; and finding the creation purpose data sub-block according to the IFUD, and reading the stored creation purpose information for displaying.

In an optional embodiment of the present application, the first attribute information display unit may be configured to display overall attribute information about the integrated file; display the stored file types read from the attribute data sub-blocks, a file format corresponding to each file type, the number of files corresponding to each file type, and the updatability state of each multimedia file; display the creator information read from the creator data sub-block; display the creation time information read from the creation time data sub-block; and display the creation purpose information read from the creation purpose data sub-block. The first attribute information display unit normally may be hidden, and will be shown when an attribute information display instruction for the integrated file is obtained. The attribute information display instruction for the integrated file may be triggered by clicking or hovering over the displayed file identifier of the integrated file.

In a specific implementation, each file information data block stores a file format, a file author, a file data size, update time corresponding to each of the recorded multimedia files, and the number of the multimedia files it recorded.

The display instruction obtaining unit further obtains an attribute information display instruction for each multimedia file. For example, in the interface shown in FIG. 7, a multimedia file attribute information display button may be additionally provided, and the display instruction obtaining unit obtains an instruction through the button.

The display apparatus further includes:

a second attribute information display unit, configured for reading a file format, a file author, a file data size, update time of each of the multimedia files, and the number of multimedia files, from each file information data block, for displaying.

In an optional embodiment of the present application, the second attribute information display unit may be configured to display attribute information about each multimedia file; display the file format, file author, file data size, update time of each of the multimedia files, and the number of multimedia files that are read from each file information data block. The attribute information display instruction for each multimedia file may be directed to only one multimedia file. The attribute information display instruction for each multimedia file may be triggered by clicking or hovering over the file sub-identification of the multimedia file.

The display apparatus further includes: an integrated file management unit that manages the integrated file in the management view mode. The integrated file management unit includes: a management instruction receiving module and an integrated file management module.

The management instruction receiving module is configured for obtaining a management instruction for the integrated file.

The integrated file management module is configured for obtaining file sub-identifiers of all multimedia files stored in the integrated file, and displaying the obtained file sub-identifiers in a preset third display position on the display screen according to each of the file information data blocks of the integrated file; displaying a management operation button in a preset fourth display position on the display screen; and after receiving an operation instruction through the management operation button, managing each multimedia file based on the operation instruction.

It can be understood that, as shown in FIG. 8, the management instruction receiving module enters the management view mode upon receiving a management instruction for the integrated file, and then displays file sub-identities of all multimedia files obtained by the integrated file management module, in the preset third display position on the display screen. The audio file block contains all file sub-identities of the audio files (multimedia files), the video file block contains all file sub-identities of the video files (multimedia files), and the like. A management operation button is displayed in the preset fourth display position on the display screen. After receiving an operation instruction through the management operation button, each multimedia file may be managed based on the operation instruction.

As shown in FIG. 8, in the management view mode, operation instructions for adding, deleting, querying, modifying, playing, displaying, or updating a single or multiple multimedia files are supported. Each operation instruction corresponds to one management operation button. When the management instruction for the integrated file is issued by the user, all the operation instructions can be synchronized to the corresponding multimedia file. At the same time, the information stored in each data block in the integrated file is updated accordingly. When the management instruction for the integrated file is automatically issued after downloading of the integrated file is completed, all the operation instructions cannot be synchronized to the corresponding multimedia files. Of course, the operation corresponding to the operation instruction cannot be performed on the path information that is invalid or is not updateable.

Figure 9:
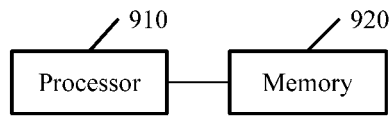
FIG. 9 is a schematic diagram of the structure of an electronic device according to an embodiment of the present application.

In another aspect, an embodiment of the present application provides an electronic device. As shown in FIG. 9, the electronic device may include: a processor 910 and a memory 920. The memory 920 is configured to store executable program code. The processor 910 implements the method for storing a plurality of multimedia files, by executing the executable program code stored in the memory 920. The method includes presetting an integrated file structure. The integrated file structure includes: a file identifier data block, an overall information data block, at least one file information data block, and an index information data block. The storing process may include the following steps:

obtaining file description information of each of the plurality of multimedia files to be stored, determining a file identifier according to the file description information of each multimedia file, and storing the file identifier to the file identifier data block;

obtaining a file type and path information of each multimedia file to be stored, and storing the path information of each multimedia file to a file information data block corresponding to the file type of the multimedia file, and sequentially storing, according to the storage order of respective file information data blocks, a file type corresponding to each file information data block to the overall information data block;

determining storage location information of each file information data block, and storing the storage location information to the index information data block; and combining the file identifier data block, the overall information data block, the at least one file information data block, and the index information data block into an integrated file.

Applying the embodiment of the present application, the processor of the electronic device executes a program corresponding to the executable program code by reading the executable program code stored in the memory. The program, when being executed, performs the method for storing a plurality of multimedia files provided by the embodiments of the present application, enabling effective management of a certain type of multimedia files, which makes it easier for a user to view the files.

In another aspect, an embodiment of the present application provides executable program code that, when executed, performs the method for storing a plurality of multimedia files provided by the embodiments of the present application. The method for storing a plurality of multimedia files includes presetting an integrated file structure. The integrated file structure includes: a file identifier data block, an overall information data block, at least one file information data block, and an index information data block. The storing process may include the following steps:

obtaining file description information of each of the plurality of multimedia files to be stored, determining a file identifier according to the file description information of each multimedia file, and storing the file identifier to the file identifier data block;

obtaining a file type and path information of each multimedia file to be stored, and storing the path information of each multimedia file to a file information data block corresponding to the file type of the multimedia file, and sequentially storing, according to the storage order of respective file information data blocks, a file type corresponding to each file information data block to the overall information data block;

determining storage location information of each file information data block, and storing the storage location information to the index information data block; and combining the file identifier data block, the overall information data block, the at least one file information data block, and the index information data block into an integrated file.

Applying the embodiment of the present application, the executable program code, when being executed, performs the method for storing a plurality of multimedia files, enabling effective management of a certain type of multimedia files, which makes it easier for a user to view the files.

In another aspect, an embodiment of the present application provides a storage medium for storing executable program code. The executable program code, when being executed, implements the method for storing a plurality of multimedia files provided in the embodiments of the present application. The method for storing a plurality of multimedia files includes presetting an integrated file structure. The integrated file structure includes: a file identifier data block, an overall information data block, at least one file information data block, and an index information data block. The storing process may include the following steps:

obtaining file description information of each of the plurality of multimedia files to be stored, determining a file identifier according to the file description information of each multimedia file, and storing the file identifier to the file identifier data block;

obtaining a file type and path information of each multimedia file to be stored, and storing the path information of each multimedia file to a file information data block corresponding to the file type of the multimedia file, and sequentially storing, according to the storage order of respective file information data blocks, a file type corresponding to each file information data block to the overall information data block;

determining storage location information of each file information data block, and storing the storage location information to the index information data block; and combining the file identifier data block, the overall information data block, the at least one file information data block, and the index information data block into an integrated file.

Applying the embodiment of the present application, the storage medium stores an application that performs the method for storing a plurality of multimedia files when being executed, enabling effective management of a certain type of different multimedia files, which makes it easier for a user to view the files.

Figure 10:
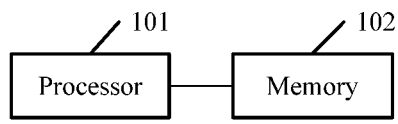
FIG. 10 is a schematic diagram of the structure of another electronic device according to an embodiment of the present application.

In another aspect, an embodiment of the present application provides an electronic device. As shown in FIG. 10, the electronic device may include: a processor 101 and a memory 102. The memory 102 is used to store executable program code. The processor 101 implements the method for reading an integrated file stored based on the method for storing a plurality of multimedia files provided in the embodiments of the present application, by executing the executable program code stored in the memory 102. The method for reading an integrated file stored based on the method for storing a plurality of multimedia files may include the following steps:

obtaining a read instruction for the integrated file;

retrieving an index information data block of the integrated file in response to the read instruction;

determining each of file information data blocks according to location information of the file information data block stored in the index information data block;

determining a file type corresponding to each file information data block according to file types sequentially stored in the overall information data block;

determining a reading mode for each file information data block according to the file type for each file information data block; and reading a multimedia file corresponding to the path information stored in each file information data block in the reading mode for the file information data block.

Applying the embodiment of the present application, the processor of the electronic device executes a program corresponding to the executable program code by reading the executable program code stored in the memory. The program, when being executed, performs the method for reading an integrated file stored based on the method for storing a plurality of multimedia files provided by the embodiments of the present application, enabling the reading of a plurality of multimedia files recorded in the integrated file, which makes it convenient for a user to view the files.

In another aspect, an embodiment of the present application provides executable program code that, when executed, implements the method for reading an integrated file stored based on the method for storing a plurality of multimedia files provided in the embodiments of the present application. The method for reading an integrated file stored based on the method for storing a plurality of multimedia files may include steps:

obtaining a read instruction for the integrated file;

retrieving an index information data block of the integrated file in response to the read instruction;

determining each of file information data blocks according to location information of the file information data block stored in the index information data block;

determining a file type corresponding to each file information data block according to file types sequentially stored in the overall information data block;

determining a reading mode for each file information data block according to the file type for each file information data block; and reading a multimedia file corresponding to the path information stored in each file information data block in the reading mode for the file information data block.

Applying the embodiment of the present application, the executable program code, when being executed, performs the method for reading an integrated file stored based on the method for storing a plurality of multimedia files provided by the embodiments of the present application. This enables the reading of a plurality of multimedia files recorded in the integrated file, which makes it convenient for a user to view the files.

In another aspect, an embodiment of the present application provides a storage medium for storing an executable program code that, when being executed, implements the method for reading an integrated file stored based on the method for storing a plurality of multimedia files provided in the embodiments of the present application. The method for reading an integrated file stored based on the method for storing a plurality of multimedia files may include steps:

obtaining a read instruction for the integrated file;

retrieving an index information data block of the integrated file in response to the read instruction;

determining each of file information data blocks according to location information of the file information data block stored in the index information data block;

determining a file type corresponding to each file information data block according to file types sequentially stored in the overall information data block;

determining a reading mode for each file information data block according to the file type for each file information data block; and reading a multimedia file corresponding to the path information stored in each file information data block in the reading mode for the file information data block.

Applying the embodiment of the present application, the storage medium stores an application that, when being executed, performs the method for reading an integrated file stored based on the method for storing a plurality of multimedia files provided by the embodiments of the present application. This enables the reading of a plurality of multimedia files recorded in the integrated file, which makes it convenient for a user to view the files.

Figure 11:
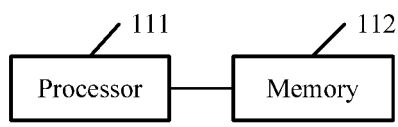
FIG. 11 is a schematic diagram of the structure of another electronic device according to an embodiment of the present application.

In another aspect, an embodiment of the present application provides an electronic device. As shown in FIG. 11, the electronic device may include: a processor 111 and a memory 112. The memory 112 is used to store executable program code. The processor 111 implements the method for displaying an integrated file stored based on the method for storing a plurality of multimedia files provided in the embodiments of the present application, by executing the executable program code stored in the memory 112. The method for displaying an integrated file stored based on the method for storing a plurality of multimedia files, may include the following steps:

obtaining a display instruction for the integrated file;

reading the integrated file in response to the display instruction;

reading the integrated file including: retrieving the index information data block of the integrated file; determining each file information data block according to location information of the file information data block stored in the index information data block; determining a file type corresponding to each file information data block according to the file types sequentially stored in the overall information data block; determining a reading mode for each file information data block according to the file type corresponding to the file information data block; and reading a multimedia file corresponding to the path information stored in each file information data block in the reading mode for the file information data block; and obtaining file content of the currently read multimedia file, and displaying the file content of the read multimedia file in a preset first display position on a display screen.

Applying the embodiment of the present application, the processor of the electronic device executes a program corresponding to the executable program code by reading the executable program code stored in the memory. The program, when being executed, performs the method for displaying an integrated file stored based on the method for storing a plurality of multimedia files provided by the embodiments of the present application. This enables the displaying of the file content of the read multimedia files recorded in the integrated file, so that a user can quickly view the multimedia files of a desired type.

In another aspect, an embodiment of the present application provides executable program code that, when being executed, implements the method for displaying an integrated file stored based on the method for storing a plurality of multimedia files provided in the embodiments of the present application. The method for displaying an integrated file stored based on the method for storing a plurality of multimedia files may include steps:

obtaining a display instruction for the integrated file;

reading the integrated file in response to the display instruction;

reading the integrated file including: retrieving the index information data block of the integrated file; determining each file information data block according to location information of the file information data block stored in the index information data block; determining a file type corresponding to each file information data block according to the file types sequentially stored in the overall information data block; determining a reading mode for each file information data block according to the file type corresponding to the file information data block; and reading a multimedia file corresponding to the path information stored in each file information data block in the reading mode for the file information data block; and obtaining file content of the currently read multimedia file, and displaying the file content of the read multimedia file in a preset first display position on a display screen.

Applying the embodiment of the present application, the executable program code, when being executed, performs the method for displaying an integrated file stored based on the method for storing a plurality of multimedia files provided by the embodiments of the present application. This enables displaying the file content of the read multimedia files recorded in the integrated file, so that a user can quickly view the multimedia files of a desired type.

In another aspect, an embodiment of the present application provides a storage medium for storing executable program code that, when being executed, implements the method for displaying an integrated file stored based on the method for storing a plurality of multimedia files provided in the embodiments of the present application. The method for displaying an integrated file stored based on the method for storing a plurality of multimedia files may include steps:

obtaining a display instruction for the integrated file;

reading the integrated file in response to the display instruction;

reading the integrated file including: retrieving the index information data block of the integrated file; determining each file information data block according to location information of the file information data block stored in the index information data block; determining a file type corresponding to each file information data block according to the file types sequentially stored in the overall information data block; determining a reading mode for each file information data block according to the file type corresponding to the file information data block; and reading a multimedia file corresponding to the path information stored in each file information data block in the reading mode for the file information data block; and obtaining file content of the currently read multimedia file, and displaying the file content of the read multimedia file in a preset first display position on a display screen.

Applying the embodiment of the present application, the storage medium stores an application that, when being executed, performs the method for displaying an integrated file stored based on the method for storing a plurality of multimedia files provided by the embodiments of the present application. This enables displaying the file content of the read multimedia files recorded in the integrated file, so that a user can quickly view the multimedia files of a desired type.

Since the system/apparatus embodiments are basically similar to the method embodiments, the description thereof is relatively simple, and the relevant parts can be referred to the description of the method embodiment.

In an optional embodiment of the present application, herein, the relationship terms herein such as "first", "second" and the like are only used to distinguish one entity or operation from another entity or operation, but do not necessarily require or imply that there is actual relationship or order between these entities or operations. Moreover, the terms "include", "comprise", or any other variants thereof are intended to cover a non-exclusive inclusion, such that processes, methods, articles, or devices comprising a series of elements comprise not only those elements listed but also those not specifically listed or the elements intrinsic to these processes, methods, articles, or devices. Without further limitations, elements defined by the term "comprise(s) a . . . " or "include(s) a . . . " do not exclude that there are other identical elements in the processes, methods, articles, or devices which comprise these elements.

Those of ordinary skill in the art will appreciate that all or some of the steps in the method described above may be implemented by a program instructing the associated hardware. Said program may be stored in a computer-readable storage medium, such as a ROM/RAM, magnetic disk, optical disk, etc.

The above description is for only the preferred embodiments of the present application and is not intended to limit the protection scope of the present application. Any amendments, equivalent substitutions, improvements made within the spirit and principle of the present application are all included in the protection scope of the present application.

The invention claimed is:

1. A method for storing a plurality of multimedia files, wherein an integrated file structure is preset, the integrated file structure comprises: a file identifier data block, an overall information data block, at least one file information data block, and an index information data block, and the storing comprises:
   obtaining file description information of each of the plurality of multimedia files to be stored, determining a file identifier according to the file description information of each multimedia file, and storing the file identifier to the file identifier data block;
   obtaining a file type and path information of each multimedia file to be stored, and storing the path information of each multimedia file to a file information data block corresponding to the file type of the multimedia file, and sequentially storing, according to the storage order of respective file information data blocks, a file type corresponding to each file information data block to the overall information data block;
   determining storage location information of each file information data block, and storing the storage location information to the index information data block; and
   combining the file identifier data block, the overall information data block, the at least one file information data block, and the index information data block into an integrated file.

2. The method of claim 1, wherein after storing the file identifier to the file identifier data block, the method further comprises:
   storing a preset integrated file management format identifier IFMF to the file identifier data block;
   after storing the path information of each multimedia file to a file information data block corresponding to the file type of the multimedia file, the method further comprises: storing a preset integrated file file description identifier IFFD to the file information data block;
   after sequentially storing a file type corresponding to each file information data block to the overall information data block, the method further comprises: storing a preset integrated file overall description identifier IFOD to the overall information data block; and
   after storing the storage location information to the index information data block, the method further comprises: storing a preset integrated file index description identifier IFID to the index information data block.

3. The method of claim 1, wherein sequentially storing a file type corresponding to each file information data block to the overall information data block, comprises:
   sequentially storing a file type corresponding to each file information data block to an attribute data sub-block of the overall information data block;
   the method further comprises:
   obtaining a file format corresponding to each file type, the number of files of each file type, and an updatability state of each multimedia file, and storing to the attribute data sub-block of the overall information data block; and
   recording information about a creator, creation time and creation purpose of the integrated file, storing the creator information in a creator data sub-block of the overall information data block; storing the creation time information in a creation time data sub-block of the overall information data block; and storing the creation purpose information in a creation purpose data sub-block of the overall information data block.

4. The method of claim 3, wherein
   after sequentially storing a file type corresponding to each file information data block to an attribute data sub-block of the overall information data block, the method further comprises:
   storing a preset integrated file attribute description identifier IFAD to the attribute data sub-block;
   after storing the creator information in the creator data sub-block of the overall information data block, the method further comprises: storing a preset integrated file creator description identifier IFCD to the creator data sub-block;
   after storing the creation time information in the creation time data sub-block of the overall information data block, the method further comprises: storing a preset integrated file creation time identifier IFCT to the creation time data sub-block; and
   after storing the creation purpose information in the creation purpose data sub-block of the overall information data block, the method further comprises: storing a preset integrated file usage description identifier IFUD to the creation purpose data sub-block.

5. The method of claim 3, wherein the path information comprises a file sub-identifier and storage address information of a corresponding multimedia file;
   the method further comprises:
   when new storage address information for the file sub-identifier of the multimedia file is detected and the updatability state for the multimedia file stored in the attribute data sub-block is updateable, updating path information corresponding to the file sub-identifier; and
   recording update time that the path information is updated, in the file information data block, and storing the update time to the overall information data block as update time of the integrated file.

6. The method of claim 1, further comprising:
obtaining, by file types of the multimedia files, a file format, a file author, a file data size, and update time of each of the multimedia files to be stored and the number of multimedia files recorded in each of the file information data blocks, and storing to respective file information data blocks corresponding to the file types.

7. The method of claim 1, wherein the file identifier data block is located at a header of the preset integrated file structure;
determining storage location information of each file information data block, and storing the storage location information to the index information data block, comprises:
determining a data size of each file information data block, determining a data offset of each file information data block relative to the file identifier data block according to the data size, and storing the data offset to the index information data block.

8. An apparatus for storing a plurality of multimedia files, comprising
a processor, and
a memory storing executable instructions that, when executed by the processor, perform the operations of the method of claim 1.

* * * * *